(12) United States Patent
Tanaka et al.

(10) Patent No.: US 10,197,011 B2
(45) Date of Patent: *Feb. 5, 2019

(54) AFTERBURNER AND AIRCRAFT ENGINE

(71) Applicant: IHI Corporation, Koto-ku (JP)

(72) Inventors: Shinji Tanaka, Tokyo (JP); Katsuyoshi Takahashi, Tokyo (JP); Jun Hosoi, Tokyo (JP)

(73) Assignee: IHI Corporation, Koto-ku (JP)

( * ) Notice: Subject to any disclaimer, the term of this patent is extended or adjusted under 35 U.S.C. 154(b) by 456 days.

This patent is subject to a terminal disclaimer.

(21) Appl. No.: 15/193,286

(22) Filed: Jun. 27, 2016

(65) Prior Publication Data

US 2017/0089300 A1 Mar. 30, 2017

Related U.S. Application Data

(63) Continuation of application No. PCT/JP2015/062716, filed on Apr. 27, 2015.

(30) Foreign Application Priority Data

Apr. 30, 2014 (JP) .................. 2014-093553

(51) Int. Cl.
*F02K 3/10* (2006.01)
*F01D 25/24* (2006.01)
(Continued)

(52) U.S. Cl.
CPC ............... *F02K 3/10* (2013.01); *F01D 25/24* (2013.01); *F01D 25/305* (2013.01); *F02K 1/822* (2013.01);
(Continued)

(58) Field of Classification Search
CPC .......... F01D 25/305; F02K 1/822; F02K 3/10; F23R 3/18; F23R 3/20; F23R 3/286; F23R 3/34
See application file for complete search history.

(56) References Cited

U.S. PATENT DOCUMENTS 3,100,627 A 8/1963 Wilde
3,765,178 A 10/1973 Hufnagel et al.
(Continued)

FOREIGN PATENT DOCUMENTS

GB 2 202 589 A 9/1988
JP 49-92423 9/1974
(Continued)

OTHER PUBLICATIONS

Office Action dated Sep. 19, 2017 in Japanese Patent Application No. 2014-093553.

(Continued)

*Primary Examiner* — Scott Walthour
(74) *Attorney, Agent, or Firm* — Oblon, McClelland, Maier & Neustadt, L.L.P.

(57) ABSTRACT

The present embodiment improves the durability of an afterburner and yet suppresses a reduction in the engine efficiency of an aircraft engine. A ring-shaped cooling channel through which cooling air flows is formed between the outer peripheral surface of a liner and the inner peripheral surface of a rear duct. A plurality of cooling holes for blowing the cooling air along the inner peripheral surface of the liner are formed penetrating the liner. A ring-shaped annulus flame-holding member on the inner peripheral surface of the liner is provided concentrically with respect to a plurality of radial flame-holding members. The inner diameter of the annulus flame-holding member decreases in the downstream direction. The annulus flame-holding member functions as a throttle ring which throttles the flowing of a main flow of a mixed gas inside the liner.

2 Claims, 4 Drawing Sheets

(51) Int. Cl.

| | | |
|---|---|---|
| *F23R 3/28* | (2006.01) | |
| *F23R 3/18* | (2006.01) | |
| *F01D 25/30* | (2006.01) | |
| *F23R 3/34* | (2006.01) | |
| *F23R 3/20* | (2006.01) | |
| *F02K 1/82* | (2006.01) | |

(52) U.S. Cl.
CPC ............... *F23R 3/18* (2013.01); *F23R 3/20* (2013.01); *F23R 3/28* (2013.01); *F23R 3/286* (2013.01); *F23R 3/34* (2013.01); *F05D 2220/323* (2013.01); *F05D 2240/35* (2013.01); *F23R 2900/03041* (2013.01); *Y02T 50/675* (2013.01)

(56) References Cited

U.S. PATENT DOCUMENTS

| | | | |
|---|---|---|---|
| 3,931,707 A * | 1/1976 | Vdoviak | ............ F23R 3/20 60/765 |
| 4,203,285 A | 5/1980 | Hanloser et al. | |
| 4,817,378 A | 4/1989 | Giffin, III et al. | |
| 5,076,062 A | 12/1991 | Abreu | |
| 5,396,761 A | 3/1995 | Woltmann et al. | |
| 5,400,589 A | 3/1995 | Mahias et al. | |
| 5,483,794 A | 1/1996 | Nicoll et al. | |
| 7,565,804 B1 | 7/2009 | Frash et al. | |
| 2005/0274114 A1 * | 12/2005 | Cortes | ............ F02K 1/386 60/761 |
| 2006/0137352 A1 | 6/2006 | Prasad et al. | |
| 2006/0213180 A1 * | 9/2006 | Koshoffer | ............ F02K 3/10 60/226.1 |
| 2008/0098740 A1 * | 5/2008 | Roberts | ............ F02K 3/10 60/765 |

FOREIGN PATENT DOCUMENTS

| | | |
|---|---|---|
| JP | 63-227930 A | 9/1988 |
| JP | 1-189420 | 7/1989 |
| JP | 6-193509 | 7/1994 |
| JP | 9-4511 | 1/1997 |
| JP | 9-119346 | 5/1997 |
| JP | 9-242609 | 9/1997 |
| JP | 2008-8606 | 1/2008 |

OTHER PUBLICATIONS

English Translation of International Search Report dated Jul. 21, 2015 in PCT/JP2015/062716, filed Apr. 27, 2015.
Written Opinion dated Jul. 21, 2015 in PCT/JP2015/062716, filed Apr. 27, 2015.
Extended European Search Report dated Aug. 4, 2017 in Patent Application No. 15786393.7.

* cited by examiner

AFTERBURNER AND AIRCRAFT ENGINE

CROSS REFERENCE TO RELATED APPLICATIONS

This application is a continuation application of international application No. PCT/JP2015/062716 filed Apr. 27, 2015, which claims priority to Japanese Patent Application No. 2014-093553 filed Apr. 30, 2014, each of which is hereby incorporated by reference in their entity.

BACKGROUND

1. Field

The present embodiment relates to an afterburner or the like which supplies fuel to a gas mixture of combustion gas discharged from a core flow path of an aircraft engine and air discharged from a fan flow path of the aircraft engine for burning (afterburning) to increase thrust of the aircraft engine.

2. Description of Related Art

Various studies and developments are being made on afterburners in recent years according to demand for increasing thrust of aircraft engines. The configuration of a general afterburner is briefly described below.

At the outlet of (behind) an engine case of an aircraft engine, a rear duct (an exhaust duct) is provided. Within the rear duct, a cylindrical liner is provided, through which a gas mixture flows. Between the outer circumferential surface of the liner and the inner circumferential surface of the rear duct, an annular cooling flow path is formed, through which a part of air discharged from a fan flow path flows as cooling air. The liner is provided with plural penetrating cooling holes to blow out the cooling air along the inner circumferential surface of the liner. The cooling air flows through the cooling flow path during operation of the aircraft engine for convection cooling of the liner. The cooling air having contributed to the convection cooling of the liner blows out of the plural cooling holes to form a film cooling layer covering the inner circumferential surface of the liner for film cooling of the liner.

The rear duct is provided with a fuel injector which injects fuel liquid in the liner. Downstream of the fuel injector in the rear duct, an igniter (an ignition plug) is provided. The igniter ignites the gas mixture containing the fuel in the liner. Downstream of the fuel injector in the liner, a flame holder to hold flame is also provided. The flame holder includes plural radial flame holding members which are situated in a radial fashion within the liner. Each radial flame holding member forms a flame holding area (low-velocity area).

The conventional arts relating to the present embodiment are disclosed in Patent Documents 1 and 2.

PATENT DOCUMENTS

Patent Document 1: JP 2008-8606 A
Patent Document 2: JP H9-4511 A

SUMMARY

Burnout of the liner during operation of the aircraft engine does not occur evenly across the liner. Burnout tends to be severe downstream of the flame holder in the liner. To increase the durability of the liner, that is, the durability of the afterburner, it may be suitable to increase the number of cooling holes located in a portion near the flame holder in the liner (a portion aligned with the flame holder) or in a portion upstream of the flame holder and thereby increase the performance of cooling the part of the liner directly downstream of the flame holder. On the other hand, increasing the number of cooling holes results in increasing the flow rate of consumed cooling air, thus reducing the engine efficiency of the aircraft engine. It is therefore difficult to increase the durability of the afterburner while preventing a decrease in engine efficiency of the aircraft engine.

Accordingly, an object of the present embodiment is to provide an afterburner having a new configuration and the like which are capable of solving the aforementioned problem.

A first aspect of the present embodiment is an afterburner which supplies fuel to a gas mixture of combustion gas discharged from a core flow path (a main flow path) of an aircraft engine and air discharged from a fan flow path (a bypass flow path) of the aircraft engine for burning (afterburning) to increase thrust of the aircraft engine, the afterburner including: a rear duct (an exhaust duct) provided at the outlet of (behind) an engine case of the aircraft engine; a cylindrical liner which is provided within the rear duct and allows the gas mixture to flow; a fuel injector which injects the fuel in the form of liquid in the liner; an igniter (an ignition plug) which is provided downstream of the fuel injector (downstream of the injection place of the fuel injector) and ignites the gas mixture containing the fuel in the liner; a flame holder which is situated downstream (directly downstream) of the fuel injector and is configured to hold flame, the flame holder including a plurality of radial flame holding members which are situated in a radial fashion inside the liner and propagate flame in the radial direction; and a throttle ring (an annular throttle member) which is provided at a position aligned with the radial flame holding members on the inner circumferential surface of the liner (at the same position in the axial direction as the radial flame holding members) and is configured to throttle the main flow of the gas mixture, in which between the outer circumferential surface (the outer wall surface) of the liner and the inner circumferential surface (the inner wall surface) of the rear duct, an annular cooling path is formed, through which a part of the air discharged from the fan flow path flows as cooling air, and the liner includes a plurality of penetrating cooling holes to blow out the cooling air along the inner circumferential surface of the liner.

Herein, in the claims and specification of the application, the meaning of "to be situated" includes "to be directly situated" and also "to be indirectly situated with another member interposed". The meaning of "to be provided" includes "to be directly provided" and also "to be indirectly provided with another member interposed". The "downstream" refers to downstream in the flowing direction of the main flow of combustion gas, air, or gas mixture and means that the direction toward the back of the aircraft engine. The "inner diameter decreases towards the downstream end" means the inner diameter decreases towards the downstream end as a whole and includes a case where the inner diameter does not continually decrease towards the downstream end. Moreover, "the radial direction" refers to the radial direction of the aircraft engine (in other words, the radial direction of the rear duct or the liner), The "axial direction" refers to the axial direction of the aircraft engine (in other words, the axial direction of the rear duct or the liner).

According to the first aspect, the fuel is injected from the fuel injector in the liner during operation of the aircraft engine, and the gas mixture containing the fuel is ignited by the igniter. Flame is thereby formed downstream (directly downstream) of the flame holder while the gas mixture containing the fuel is burned in the liner (afterburning). A lot of heat energy is therefore put into the combustion gas within the liner, thus increasing the thrust of the aircraft engine.

On the other hand, a part of the air discharged from the fan flow path flows through the cooling flow path as the cooling air during operation of the aircraft engine. The liner is thereby convection-cooled. Moreover, the cooling air having contributed to the convection cooling of the liner is blown out from the plural cooling holes and forms the film cooling layer covering the inner circumferential surface of the liner. The liner is thereby film-cooled.

Herein, the throttle ring which throttles the main flow of the gas mixture is provided at the position aligned with the radial flame folding member on the inner circumferential surface of the liner. This increases the difference in pressure between the outside of the liner and the outlet of the throttle ring. The cooling air blown out of the cooling holes located in the flame holder side of the liner (part aligned with the flame holder) therefore forms a stable film cooling layer directly downstream of the flame holder on the inner circumferential surface of the liner. It is therefore possible to sufficiently increase the performance of cooling the part of the liner directly downstream of the flame holder without increasing the number of cooling holes located in part of the liner 31 on the flame holder side or in part upstream of the flame holder.

A second aspect of the present invention is an aircraft engine which generates thrust by discharging combustion gas (combustion gas and air) rearward, the aircraft engine including an afterburner according to the first aspect.

According to the second aspect, it is possible to exert the same operation as the operation according to the first aspect.

According to the present embodiment, the performance of cooling part of the liner directly downstream of the flame holder is increased sufficiently without increasing the number of cooling holes located in part of the liner on the flame holder side. It is therefore possible to increase the durability of the liner, that is, the durability of the afterburner while preventing a decrease in engine efficiency of the aircraft engine.

DETAILED DESCRIPTION OF EMBODIMENTS

Figure 1:
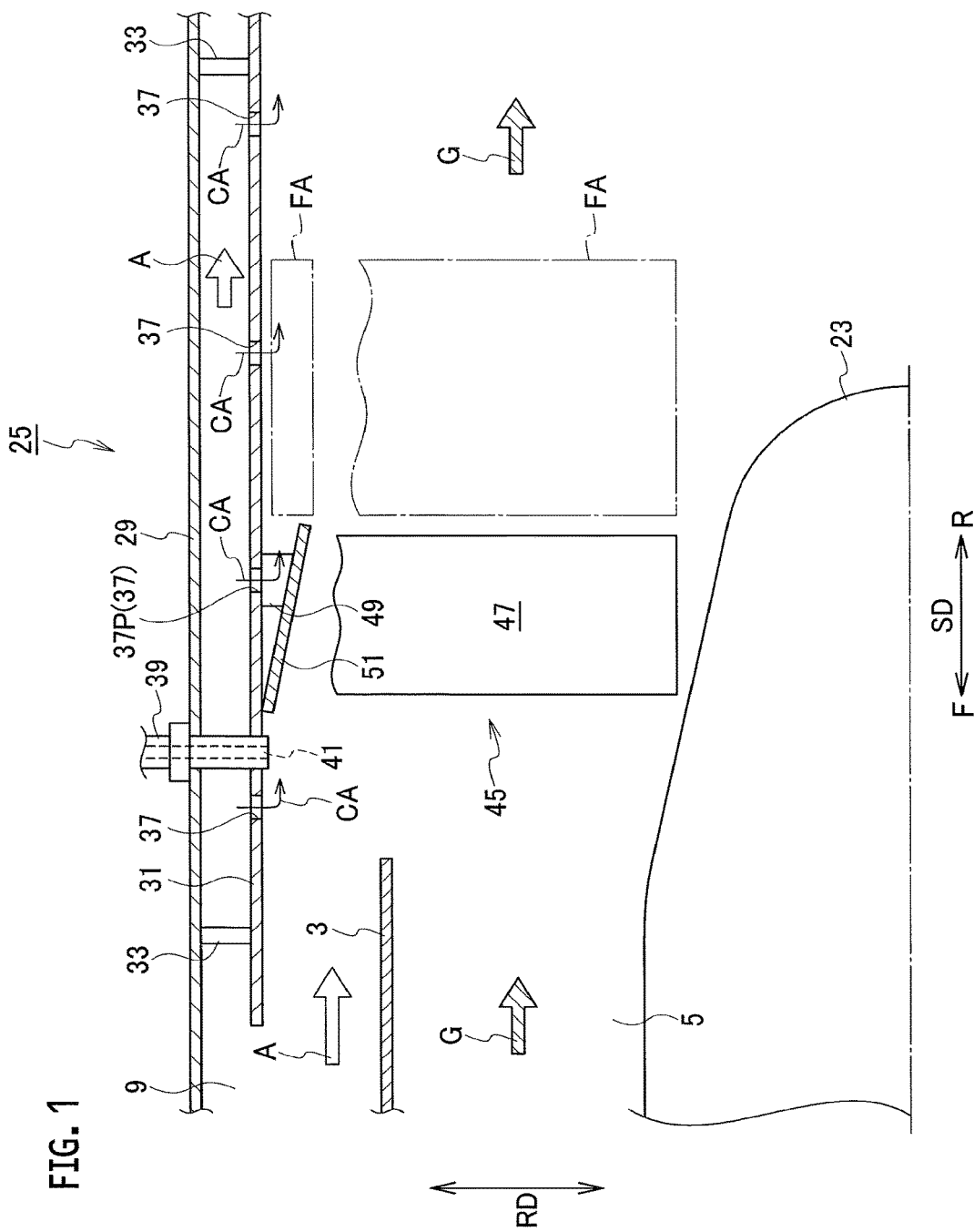
FIG. 1 is a cross-sectional side view of an afterburner according to an embodiment of the present disclosure, which is an enlarged view of part I indicated by an arrow in FIG. 4.

A description is given of an embodiment of the present disclosure with reference to FIGS. 1 to 4. In the drawings, F indicates the forward direction (the upstream direction); R, the rearward direction (the downstream direction); SD, the axial direction; RD, the radial direction; and CD, the circumferential direction.

Figure 4:
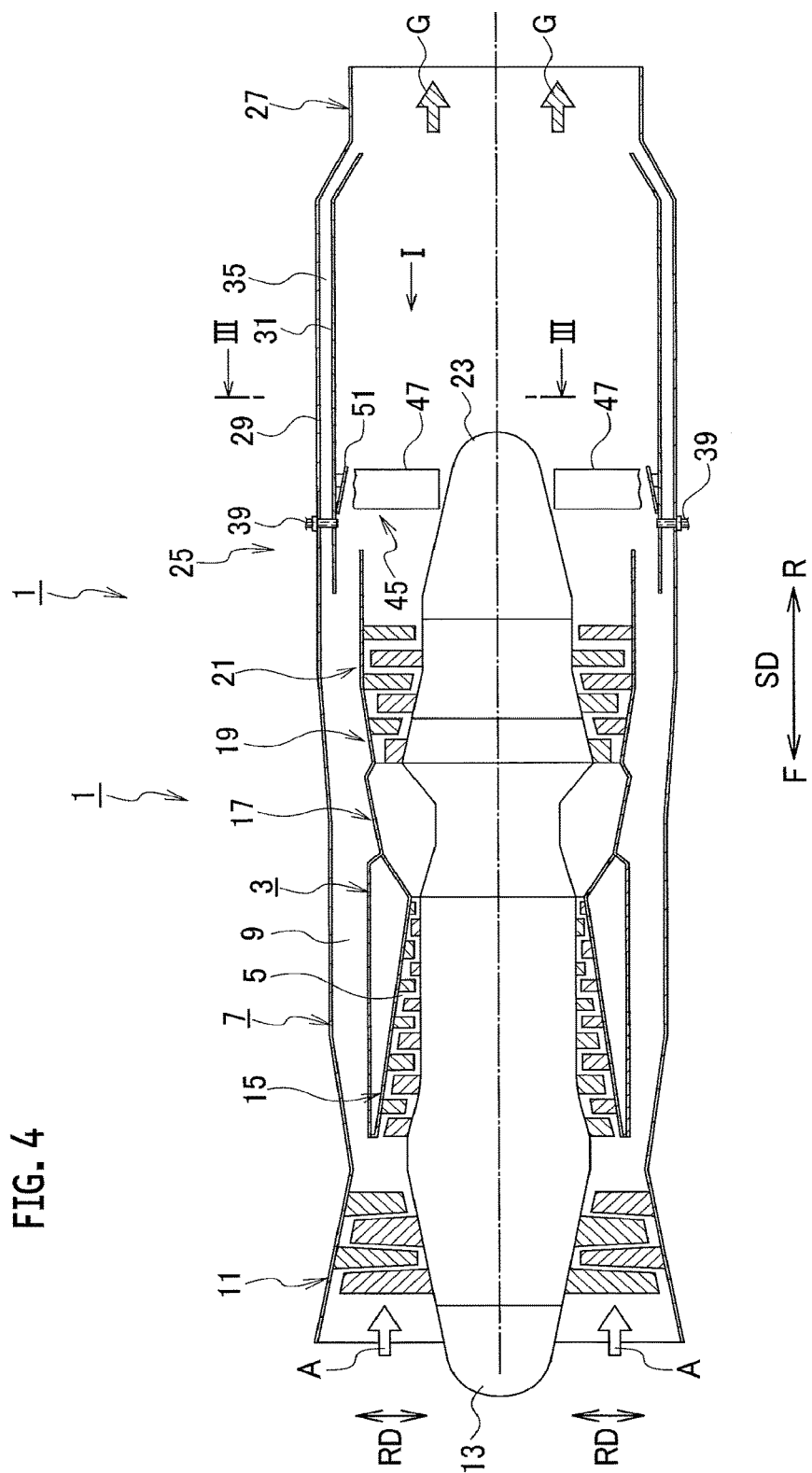
FIG. 4 is a cross-sectional side view of the aircraft engine according to the embodiment of the present disclosure.

As illustrated in FIG. 4, an aircraft engine 1 according to the embodiment of the present disclosure is a device which discharges combustion gas (high-temperature gas) G and air (low-temperature air) A rearward to generate thrust (engine thrust). The aircraft engine 1 includes a cylindrical core case (an engine inner cylinder) 3, inside of which an annular core flow path (a main flow path) 5 is formed. Outside of the core case 3, a cylindrical engine case (an engine outer cylinder) 7 is situated concentrically with the core case 3. Between the inner circumferential surface of the engine case 7 and the outer circumferential surface of the core case 3, an annular fan flow path (a bypass flow path) 9 is formed.

Within front part of the engine case 7, a fan 11 is situated, which takes air A into the core flow path 5 and fan flow path 9. In front of the center of the fan 11, an inlet cone 13 guiding the air A rearward is situated. Behind the fan 11, a compressor 15 is situated. The compressor 15 compresses the air A taken into the core flow path 5. Behind the compressor 15, a burner 17 is situated. The burner 17 burns the air A containing fuel to generate combustion gas G.

Behind the burner 17, a high-pressure turbine 19 is situated. The high-pressure turbine 19 is driven by expansion of the combustion gas G from the burner 17 and drives the compressor 15 in conjunction with the same, Behind the high-pressure turbine 19, a low-pressure turbine 21 is provided. The low-pressure turbine 21 is driven by expansion of the combustion gas G and drives the fan 11 in conjunction with the same. Moreover, within rear part of the core case 3, a tail cone 23 guiding the combustion gas G rearward is provided concentrically with the core case 3. The tail cone 23 protrudes rearward from the core case 3.

In rear part of the engine case 7, an afterburner 25 is situated. The afterburner 25 supplies fuel to a gas mixture of the combustion gas G discharged from the core flow path 5 and the air (low-temperature air) A from the fan flow path 9 for burning (afterburning) to increase the thrust (engine thrust) of the aircraft engine 1. Behind the afterburner 25, an exhaust nozzle 27 is situated. The exhaust nozzle 27 discharges the combustion gas G and air A (the gas mixture of the combustion gas G and air A).

Next, a description is given of the concrete configuration of the afterburner 25 according to the embodiment of the present disclosure.

Figure 2:
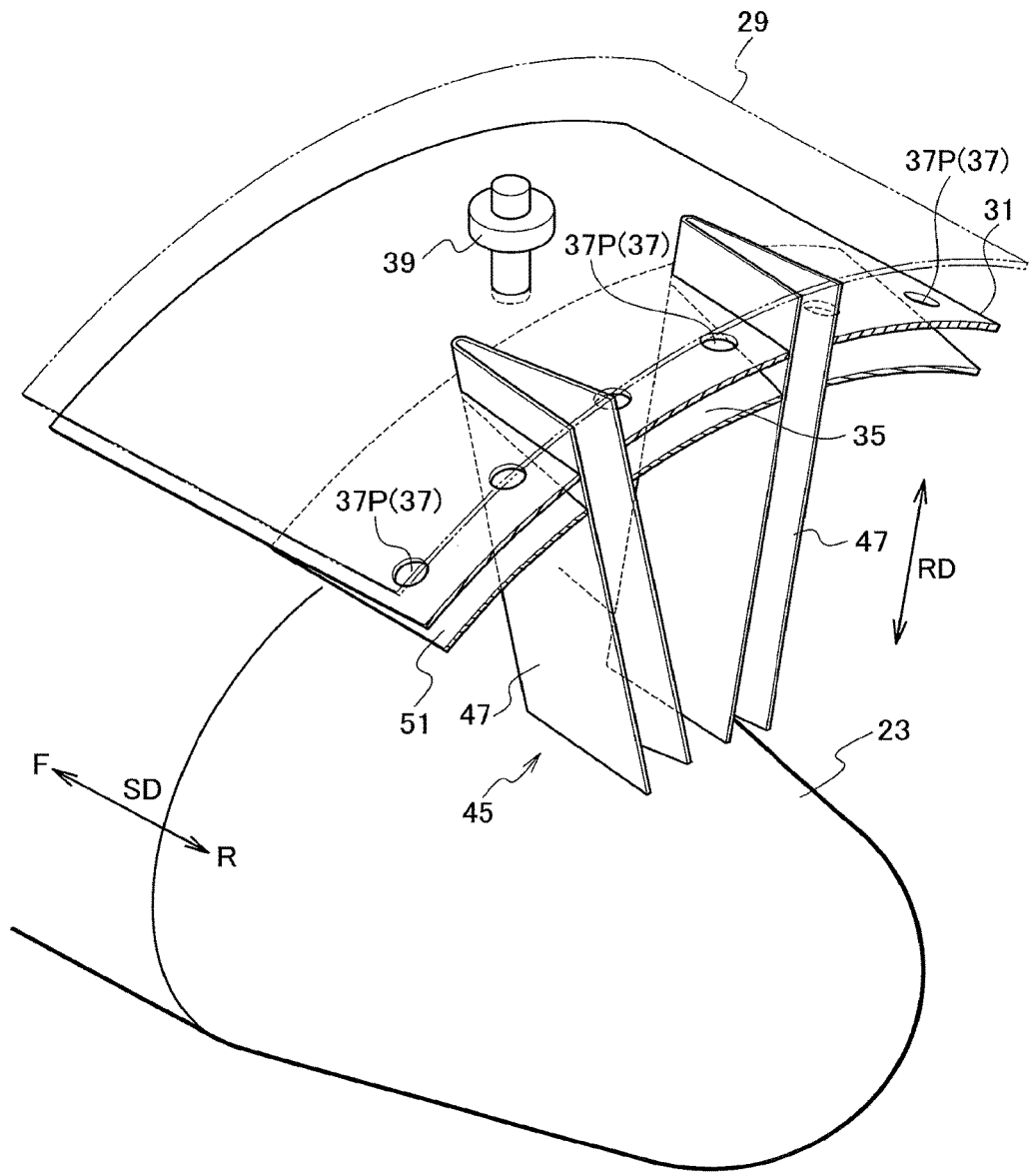
FIG. 2 is a perspective view of aspect part of the afterburner according to the embodiment of the present disclosure.
Figure 3:
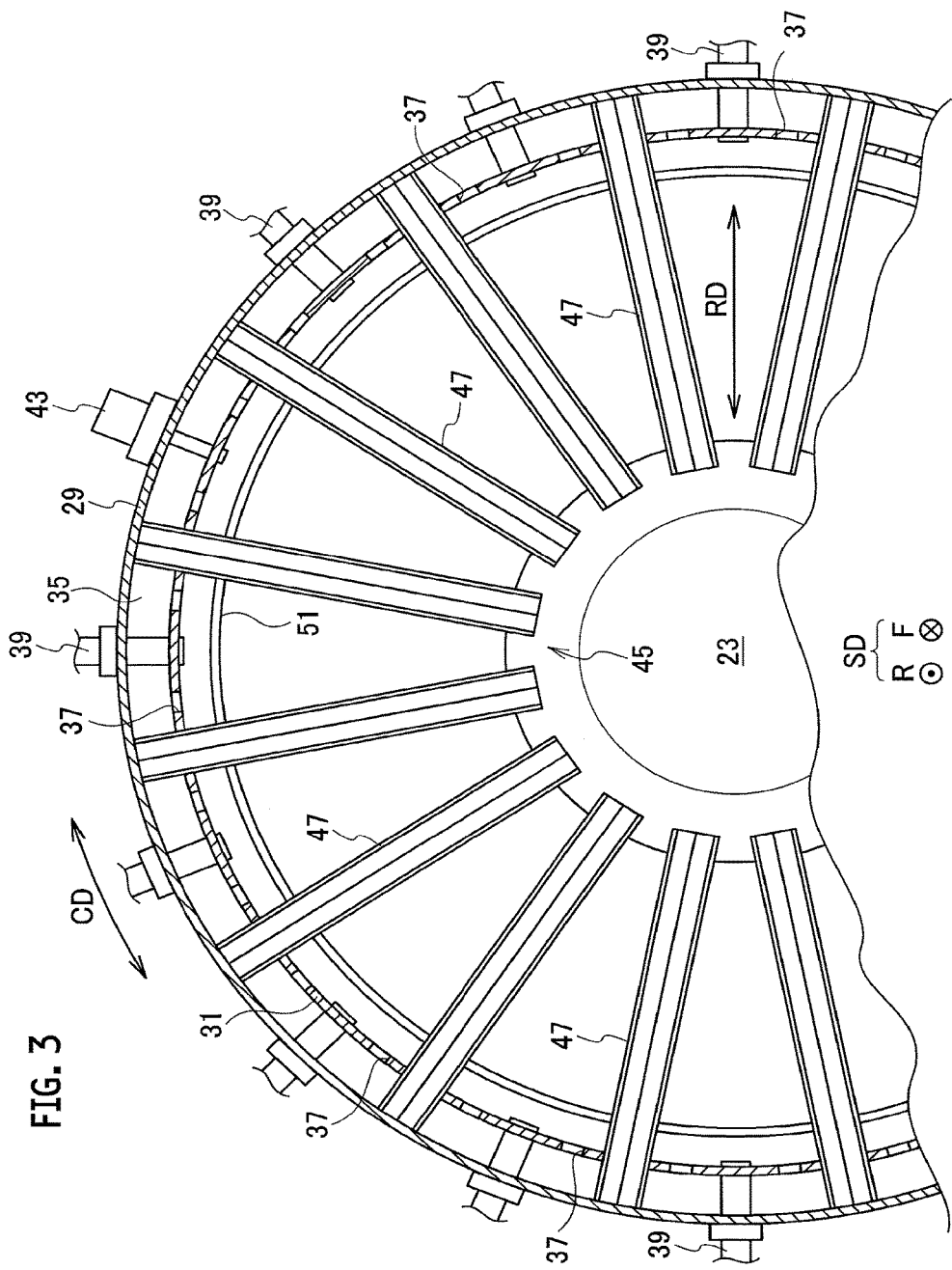
FIG. 3 is an enlarged view taken along a line III-III in FIG. 4.

As illustrated in FIGS. 1 to 3, a rear duct (an exhaust duct) 29 is situated concentrically with the engine case 7 downstream of (behind) the engine case 7. Within the rear duct 29, a cylindrical liner 31 is situated concentrically with the rear duct 29, with plural supports 33 (one of which is illustrated in FIG. 1) interposed therebetween. The liner 31 allows the gas mixture to flow rearward. The cross section of the liner 31 along the axial direction (the axial direction of the aircraft engine 1) may be corrugated. Between the outer circumferential surface (the outer wall surface) of the liner 31 and the inner circumferential surface (the inner wall surface) of the rear duct 29, an annular cooling flow path 35 is formed, through which a part of the air A discharged from the fan path flow 9 flows as cooling air CA. Moreover, plural penetrating cooling holes 37 are formed evenly across the liner 31. The plural cooling holes 37 are configured to blow out the cooling air CA along the inner circumferential surface of the liner 31. To mix the combustion gas G discharged from the core flow path 5 and the air A discharged from the fan flow path 9A, a publicly known mixer (not illustrated, see JP No. 2013-181473 A and JP 2012-132630 A, for example) may be situated in rear part of the core case 3.

The rear duct 29 is provided with plural hollow stick-shaped fuel injectors 39, which inject liquid fuel within the liner 31. The fuel injectors 39 are situated at intervals in the circumferential direction (in a predetermined circumferential direction). The plural fuel injectors 39 are connected to a fuel supply source (not illustrated) which supplies the liquid fuel. The top of each fuel injector 39 penetrates the liner 31. At the top of each fuel injector 39, an injection hole 41 is formed. The injection hole 41 can inject the liquid fuel. Downstream of the injection holes 41 (injection places) of the fuel injectors 39 in the rear duct 29, plural igniters (ignition plugs) 43 (one of which is illustrated in FIG. 3) are situated at intervals in the circumferential direction. The igniters 43 ignite (light) the gas mixture containing the fuel within the liner 31. The top of each igniter 43 penetrates the liner 31. Instead of the plural hollow stick-shaped fuel injectors 39 provided for the rear duct 29, a hollow annular fuel injector (not illustrated) that injects liquid fuel within the liner 31 may be situated on the inner wall surface of the liner 31.

Directly downstream of the injection holes 41 of the fuel injectors 39 in the liner 31, a flame holder 45 to hold flame is situated. The flame holder 45 includes plural radial flame holding members 47 and an annulus flame holding member 51. The plural radial flame holding members 47 are situated in a radial fashion within the liner 31 and are capable of propagating flame in the radial direction. The annulus flame holding member 51 is provided on the inner circumferential surface (the inner wall surface) of the liner 31 with plural supports 49 (one of which is illustrated in FIG. 1) interposed therebetween and is capable of propagating flame in the circumferential direction. The base end (the outside end in the radial direction) of each radial flame holding member 47 is fixed to the rear duct 29. The radial flame holding members 47 are capable of forming a flame holding area (low-speed area) FA downstream (directly downstream) thereof. The cross section of each radial flame holding member 47 along the direction orthogonal to the radial direction has a V shape opened downstream. The annulus flame holding member 51 is capable of forming the flame holding area FA downstream (directly downstream) thereof. The inner diameter of the annulus flame holding member 51 decreases with distance towards the downstream end thereof. The annulus flame holding member 51 is provided at a position aligned with the radial flame holding members 47 (at the same position in the axial direction as the radial flame holding members 47) on the circumferential surface of the liner 31. The annulus flame holding member 51 functions as a throttle ring (an annular throttle member) that throttles the main flow of the gas mixture in the liner 31. In FIG. 2, the annulus flame holding member 51 is illustrated as a single annular component. However, the annulus flame holding member 51 may be composed of plural circular flame holding segments (not illustrated) separated in the circumferential direction. The inner circumferential surface side of the annulus flame holding member 51 may be configured to have a double-layered structure so as to form in the inner circumferential surface side of the annulus flame holding member 51, an annular guide flow path (not illustrated) guiding the air A containing the fuel downstream.

Next, a description is given of the operation and effects of the embodiment of the present disclosure.

When a proper starter device (not illustrated) is operated to drive the fan 11 and compressor 15, the air A is taken into the core flow path 5 and fan flow path 9 by the fan 11, and the air A taken into the core flow path 5 is compressed by the compressor 15. The air A containing fuel is then burned by the burner 17 to generate high-pressure combustion gas. By expansion of the combustion gas, the high-pressure turbine 19 and low-pressure turbine 21 are driven to drive the compressor 15 and fan 11 in conjunction. Moreover, the series of operations (drive of the fan 11, drive of the compressor 15, burning by the burner 17, drive of the high-pressure turbine 19, and drive of the low-pressure turbine 21) are successively performed to operate the aircraft engine 1. Accordingly, during operation of the aircraft engine 1, the combustion gas G having passed through the core flow path 5 and the air A having passed through the fan path flow 9 are discharged rearward from the exhaust nozzle 27 to generate thrust of the aircraft engine 1 (engine thrust). The air A discharged from the exhaust nozzle 27 covers the combustion gas G discharged from the exhaust nozzle 27 (normal operation of the aircraft engine 1).

According to a first aspect, the fuel is injected from the plural fuel injectors 39 in the liner 31 during operation of the aircraft engine 1, and the gas mixture containing the fuel is ignited by the plural igniters 43. Flame is thereby formed downstream (directly downstream) of the flame holder 45 while the gas mixture containing the fuel is burned in the liner 31 (afterburning). A lot of heat energy is thereby put into the combustion gas within the liner 31, thus increasing the thrust of the aircraft engine 1.

On the other hand, a part of the air A discharged from the fan flow path 9 flows through the cooling flow path 35 as the cooling air CA during operation of the aircraft engine 1. The liner 31 is therefore convection-cooled. Moreover, the cooling air CA having contributed to the convection cooling of the liner 31 is blown out from the plural cooling holes 37 and forms the film cooling layer (not illustrated) covering the inner circumferential surface of the liner 31. The liner 31 is therefore film-cooled. The cooling air CA having contributed to the film cooling of the liner 31 becomes a part of the gas mixture (normal operation of the afterburner 25).

The annulus flame holding member 51 functions as the throttle ring as well as constituting a part of the flame holder 45. This increases the difference in pressure between the outside of the liner 31 and the outlet of the annulus flame holding member 51. The cooling air CA blown out of plural predetermined cooling holes 37P (37) (one of which is illustrated in FIG. 1) located in the flame holder 45 side of the liner 31 (part of the liner 31 aligned with the flame holder 45) therefore forms a stable film cooling layer directly downstream of the flame holder 45 on the inner circumferential surface of the liner 31. It is therefore possible to sufficiently increase the performance of cooling the part of the liner 31 directly downstream of the flame holder 45 without increasing the number of cooling holes 37 located in the part of the liner 31 on the flame holder 45 side or the part thereof upstream of the flame holder 45.

Since the annulus flame holding member 51 is provided on the inner circumferential surface of the liner 31, the annulus flame member 51 is prevented from interfering with the main flow of the gas mixture within the liner 31, so that pressure loss (thrust loss) in the liner 31 is minimized (aspect operation of the afterburner 25).

According to the embodiment of the present disclosure, it is therefore possible to sufficiently increase the performance of cooling part of the liner 31 directly downstream of the flame holder 45 without increasing the number of cooling holes 37 located in part of the liner 31 on the flame holder 45 side or the like. This can increase the durability of the liner 31, that is, the durability of the afterburner 25 without reducing the engine efficiency of the aircraft engine 1. Moreover, the pressure loss in the liner 31 is minimized by preventing the interference between the annulus flame holding member 51 and the main flow of the gas mixture within the liner 31. It is therefore possible to further prevent a decrease in engine efficiency of the aircraft engine 1.

The present disclosure is not limited to the description of the above embodiment and can be embodied in various modes. The scope of the present disclosure is not limited to these embodiments.

While embodiments have been exemplified with the help of the drawings, many modifications and changes are apparent to those skilled in the art.

What is claimed is:

1. An afterburner configured to supply fuel for burning in a gas mixture of combustion gas and air, the combustion gas being discharged from a core flow path of an aircraft engine and the air being discharged from a fan flow path of the aircraft engine, the afterburner configured to increase thrust of the aircraft engine while burning the fuel in the gas mixture, the afterburner comprising:
   a rear duct provided in the outlet side of an engine case of the aircraft engine;
   a cylindrical liner positioned within the rear duct and configured to receive the combustion gas and air;
   a fuel injector configured to inject the fuel in the form of liquid in the cylindrical liner;
   an igniter positioned downstream of the fuel injector and configured to ignite the gas mixture containing the fuel in the cylindrical liner;
   a flame holder positioned downstream of the fuel injector and configured to hold flame, the flame holder including;
      a plurality of radial flame holding members which are oriented radially inside the cylindrical liner and configured to propagate flame in the radial direction; and
      an annulus flame holding member configured to propagate flame in a circumferential direction, the annulus flame holding member aligned with the plurality of radial flame holding members and positioned on an inner circumferential surface of the cylindrical liner, wherein an inner diameter of the annulus flame holding member decreases with distance from an upstream end of the annulus flame holding member such that a main flow of the gas mixture is throttled by the annulus flame holding member during operation of the afterburner, and an outer circumferential surface of the annulus flame holding member abuts the inner circumferential surface of the cylindrical liner at the upstream end of the annulus flame holding member;
   wherein an annular cooling path is defined between the outer circumferential surface of the cylindrical liner and the inner circumferential surface of the rear duct, the annular cooling path configured to receive as cooling air a part of the air discharged from the fan flow path, and wherein
   the cylindrical liner includes a plurality of penetrating cooling holes configured to blow out the cooling air along the inner circumferential surface of the cylindrical liner.

2. An aircraft engine which generates thrust by discharging combustion gas rearward, comprising the afterburner according to claim 1.

* * * * *